United States Patent [19]

Distler et al.

[11] 3,975,740

[45] Aug. 17, 1976

[54] LIQUID JET RECORDER

[75] Inventors: Walter Distler; Helmut Kraus; Christian Schwarz, all of Erlangen; Oskar Schmidt, Karlsruhe, all of Germany

[73] Assignee: Siemens Aktiengesellschaft, Erlangen, Germany

[22] Filed: Sept. 30, 1974

[21] Appl. No.: 511,032

[30] Foreign Application Priority Data

Oct. 2, 1973 Germany ............................ 2349453

[52] U.S. Cl. ............................... 346/75; 346/140 R; 358/75

[51] Int. Cl.² ........................ G01D 15/18; B41J 3/04

[58] Field of Search ................. 346/75, 140; 358/75

[56] References Cited

UNITED STATES PATENTS

| | | | |
|---|---|---|---|
| 2,573,143 | 10/1951 | Jacob | 346/75 X |
| 3,404,221 | 10/1968 | Loughren | 358/75 |
| 3,416,153 | 12/1968 | Hertz et al. | 346/75 |
| 3,737,914 | 6/1973 | Hertz | 346/75 |
| 3,832,719 | 8/1974 | Meier et al. | 346/75 |

OTHER PUBLICATIONS

Meier, J. H.; Mechanical X-Y Aiming of Ink Jet Printer Nozzles; IBM Tech. Disc. Bulletin, vol. 15, No. 5, Oct. 1972 p. 1683.

*Primary Examiner*—Joseph W. Hartary
*Attorney, Agent, or Firm*—Haseltine, Lake & Waters

[57] ABSTRACT

A liquid jet recorder having a jet ejecting arrangement, and which is connected to a pressure medium conduit for the jet-like ejection of an electrically-conductive recording liquid against a spot on a recording carrier. The liquid ejecting arrangement consists of a plurality of jet nozzles wich are jointly supplied from a common pump, which are so directed that the liquid jets ejected therefrom impinge directly adjacent each other against the recording carrier, and the liquid jets from all nozzles penetrate through a common control electrode. The number of jet nozzles in the inventive liquid jet recorder is coordinated with the desired image results and with the desired recording velocity.

6 Claims, 5 Drawing Figures

LIQUID JET RECORDER

FIELD OF THE INVENTION

The present invention relates to a fluid or liquid jet recorder.

DISCUSSION OF THE PRIOR ART

A liquid jet recorder having a jet ejecting arrangement, and which is connected to a pressure medium conduit for the jet-like ejection of an electrically-conductive recording liquid against a spot on a recording carrier, is described in U.S. Pat. No. 3,416,153. In this liquid jet recorder, interruption of the liquid jet between a jet nozzle and the recording carrier is made possible by applying a suitable voltage between the recording liquid and a control electrode. Through the intermediary of scanning the liquid, an image may thus be recorded. In an embodiment of the known liquid jet recorder, the recording carrier is mounted or stretched on a rotatably supported drum. The drum is rotated about its axis by a motor in synchronism with line impulses from an image transmitted, and concurrently displaced in an axial direction so that the unmodulated liquid jet impinges perpendicularly against the recording carrier or registration paper. If the image signal is applied to the control electrode, then the image is recorded in a linelike manner on the recording carrier.

The recording velocity, in the known liquid jet recorder, is dependent upon the ejection of the rate of recording liquid from the jet nozzle for each unit of time. The greater this rate of ejection, than the higher may be the recording speed or velocity. The ejection depends, on one hand, upon the jet nozzle diameter and, on the other hand, upon the pressure of the recording liquid. However, the liquid pressure, as well as the nozzle diameter, have limits set thereon. If the pressure exceeds a predetermined limit, then the ejection of the recording liquid for each unit of time unit no longer increases in proportion to the liquid pressure, due to the non-linearly increasing friction of the liquid.

In order to obtain a high recording velocity, a relatively high liquid pressure is required, which necessitates the use of a complicated and expensive pump. Furthermore, a high liquid pressure cause the recording liquid to spray upon impinging against the recording carrier, so as to result in an unclear and smudged image. When employing a large jet nozzle diameter, the high voltage applied between the control electrode and the recording liquid must possess a magnitude which requires a complex circuitry arrangement for the control installation. In the prior art jet beam recorder, for applicable requirements there are achievable only relatively low writing velocities.

SUMMARY OF THE INVENTION

Accordingly, it is an object of the present invention to increase the recording velocity in a liquid jet recorder of the above-mentioned type, without requiring any appreciable increase in the liquid pressure, or in the high-voltage between the control electrode and the recording liquid.

The foregoing object is inventively solved in that the liquid ejecting arrangement consists of a plurality of jet nozzles which are jointly supplied from a common pump, which are so directed that the liquid jets ejected therefrom impinge directly adjacent each other against the recording carrier, and the liquid jets from all nozzles penetrate through a common control electrode. The number of jet nozzles in the inventive liquid jet recorder is coordinated with the desired image results and with the desired recording velocity. Due to the use of a plurality of jet nozzles, in comparison with the state of the art, through only an insignificantly increased high-voltage, there is attained a satisfactory control over the jets. Furthermore, the liquid pressure, in comparison with the state of the art, need not be significantly increased.

In a preferred embodiment of the invention, the jet nozzles may be mounted on a common support plate. Other aspects of the invention provide for simple adjustment of the jet nozzles, and wherein for effecting common adjustment of all of the jet nozzles, the latter may be associated with a single control electrode. In accordance with the invention, it is also possible that a plurality of nozzle systems may be provided, which are supplied with differently colored recording liquids.

BRIEF DESCRIPTION OF THE DRAWINGS

Further advantages and details of the invention may now be ascertained from the following description of an exemplary embodiment, taken in conjunction with the accompanying drawings; in which.

DETAILED DESCRIPTION

Figure 2:
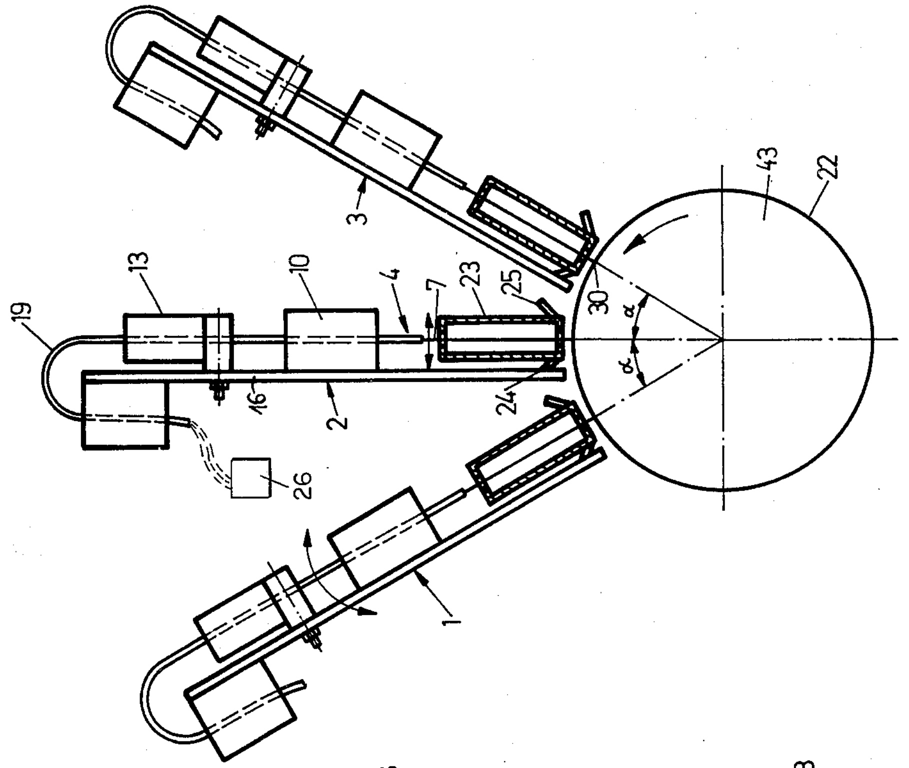
FIG. 2 is a side view of the liquid jet recorder of FIG. 1.
Figure 1:
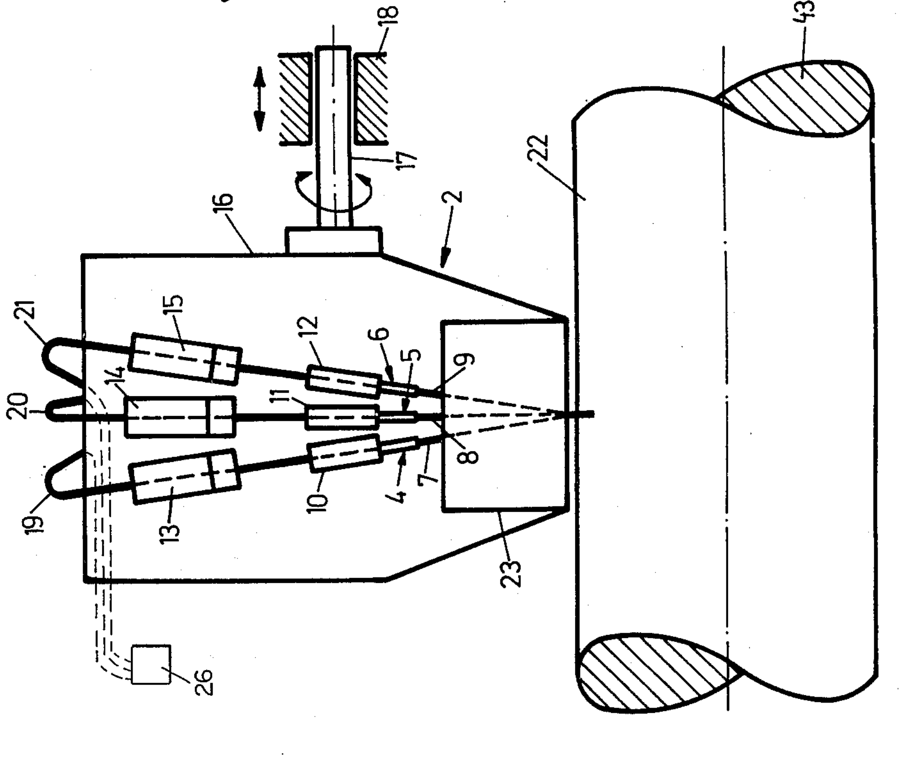
FIG. 1 illustrates a liquid jet recorder pursuant to the present invention.

The liquid jet recorder according to FIGS. 1 and 2 is a color recorder in which the image which is to be recorded is constituted of three different basic colors, for example, blue, red and yellow. Each color has a recorder unit associated therewith. The recorder thus comprises three recorder units 1 through 3. In FIG. 1, for purposes of clarity, only recorder unit 2 is illustrated. The recorder units 1 and 3 are constructed in an identical manner as the recorder unit 2.

Each of the recorder units 1 through 3 includes three jet nozzles which are supplied from a common pump with a recording liquid having a predetermined color. The nozzles of the recorder unit 2 are designated by reference numerals 4 through 6. The nozzles each consist of a flexible tube, which receives interiorly thereof a nozzle capillary which projects outwardly of the tube to some extent at the tube end. In accordance therewith, in FIG. 1 there are visible the nozzle ends 7 which are formed by the nozzle capillaries. The jet nozzles 4 through 6, respectively, are adjustably supported in bushings 10 through 12 and supports 13 through 15. The bushings 10 through 12 and supports 13 through 15 are fastened on a base plate 16, the latter of which is connected to a stub shaft 17. The stub shaft 17 is rotatably and longitudinally displaceably journalled in a bearing 18. Liquid inlet conduits 19 through 21 leads from a liquid pump to the supports 13 through 15 and are connected therein with jet nozzles 4 through 6.

Jet nozzles 4 through 6 are so oriented on base plate 16 through the intermediary of the supports 13 through 15 and bushings 10 through 12, whereby the ejected liquid jets impinge onto a recording carrier 22 directly adjacent to each other. The recording carrier 2 is mounted on a drum 43. For recordation, the drum 43 is rotated at a uniform rate. Furthermore, the recorder units 1 through 3 are displaced in the longitudinal direction of the drum 43 so that the recorded image is formed of image lines. The image information for the color which is associated with the recorder unit 2 is transmitted to a tubularly-shaped control electrode 23 common to jet nozzles 4 through 6, and through which the liquid jet may be commonly interrupted by means of a high-voltage applied between the liquid jet and the control electrode. The high-voltage has the effect of electrostatically charging the drops of the liquid jet so as to form a vapor cloud due to the electrical repelling forces, which is precipitated onto the electrode 23. The electrode 23 suitably is constituted of a porous material, and the recording liquid precipitated thereon is aspirated by means of suction conduits 24 and 25 (FIG. 2).

Figure 3:
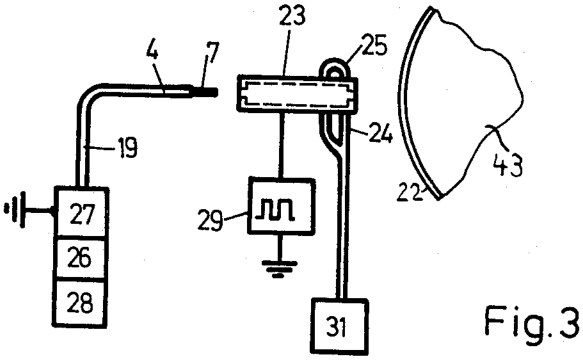
FIG. 3 is a diagrammatic representation of an arrangement for operation of the liquid jet recorder of FIGS. 1 and 2.

Having reference to FIG. 3 of the drawings, the operation of the liquid jet recorder is now described in greater detail. In FIG. 3 there is illustrated the control electrode 23, as well as jet nozzle 4 with its nozzle end 7. A liquid supply conduit 19 leads to the jet nozzle 4 from a pump 26 through a pressure regulating installation 27, the latter of which provides a uniform liquid pressure. The pump 26 draws the recording liquid from a supply receptacle 28. The control voltage is delivered from a signal generator 29 which is connected, on the one hand, to the electrode 23 and, on the other hand, to the ground. Since the recording liquid is electrically conductive and similarly is on a ground potential, the control signals are thus applied between the recording liquid and the control liquid 23. In order to achieve that the liquid jet which is ejected from the jet nozzle 4 will be completely interrupted by a control signal, there are required high voltages of the magnitude 600 volts and up to a plurality of kV. The liquid jet which is ejected from jet nozzle 4 is modulated in accordance with the image which is to be recorded. In an identical manner, are modulated the liquid jets of jet nozzles 5 and 6. The recording liquid which is precipitated on the control liquid 23 upon interruption of the liquid jet, is aspirated by a suction pump 31 through the suction conduits 24 and 25.

From FIG. 2 there may be ascertained that the liquid jets of the recorder units 1, 2 and 3 are directed towards the longitudinal central axis of drum 43. The recording of a colored image is carried out in a manner wherein, for example, the recorder unit 1 inscribes the blue image component, the recorder 2 the red image component, and the recorder unit 3 the yellow image component. The signals which are transmitted to the control electrodes of these recorder units are timewise displaced with respect to each other, so that each image point is assembled from the desired colors whereby, for example, on the image point 30 in the illustrated position of the recording carrier 22 after recording the yellow portion, after rotation of the drum 43 through an angle $\alpha$ there is recorded the red portion, and after further rotation about the angle $\alpha$ there is recorded the blue portion.

The utilization of three jet nozzles on the illustrated liquid jet recorder for a single color, enables obtaining a track width for the recording which allows for a sufficiently high rate of recording velocity. The recording velocity depends on an increase in the recording track width on the recording carrier 22. This increase may again be so much higher selected, the wider the track width of the recording. Notwithstanding the use of a relatively wide recording track, which is attained in that the jets of the jet nozzles 4 through 6 impinge on the recording carrier 22 directly adjacent to each other, it is sufficient to utilize, in comparison with the employment of a single jet nozzle, only an insignificantly increased high-voltage for modulating the liquid jets. Additionally, the liquid pressure, in comparison with the use of a single jet nozzle, need not be significantly increased.

Within the scope of the invention it is possible to employ only two, or more than three jet nozzles for each recorder unit. The number of jet nozzles depends upon the required ejection of the recording liquid for each unit of time, and thereby upon the desired recording velocity.

From FIG. 1 there may be ascertained that the recorder unit 2 is adjustable with respect to the drum 43 through adjustment of the stub shaft 17 within bearing 18. In a similar manner are also adjustable the recorder units 1 through 3. Furthermore, the jet nozzles 4 through 6 and, similarly, the jet nozzles of recorder units 1 through 3 are individually adjustable on base plate 16. This is more closely described in connection with FIGS. 4 and 5 of the drawings.

Figure 5:
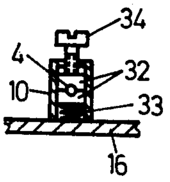
FIG. 5 is a section taken along line V—V in FIG. 4.

Thus, for example, in FIG. 5 there is illustrated the jet nozzle 4. The jet nozzle 4 is retained in a cylindrical recess of bushing 10 between two cylindrical guides 32. The cylindrical guides 32 are pressed against an adjusting screw 34 by a pressure spring 33. If the adjusting screw is turned, then the jet nozzle end 7 is moved in perpendicular to base plate 16 and, consequently, also moved in perpendicular to that jet plane in which the jet nozzles 4 through 6 are located in their recording positions. This movement is possible since the jet nozzle 4 is bendable.

Figure 4:
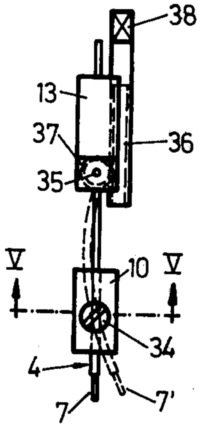
FIG. 4 shows a detail of a jet nozzle in the liquid jet recorder of FIGS. 1 and 2, illustrated with its support and actuating devices.

An adjustment of the jet nozzle 4 in the jet plane accordingly is possible in that the support 13 is connected with base plate 16, so as to be rotatable about an axis 35. The rotation of support 13 is carried out by means of a screw 36 which engages with a gear wheel 37 which is rigidly connected with the support 13. If the screw 36 is at the square 38 rotated by means of a key, then the support 13 is also rotated about axis 35. Thereby the nozzle end 7 is adjustable in the plane of the jet since the jet nozzle 4 bends itself. In FIG. 4, for example, the position 7′ of the nozzle end 7 which is obtainable through turning of the screw 36, is illustrated in chain-dotted lines.

From FIGS. 4 and 5 there may be ascertained that the jet nozzle 4 is adjustable in the plane of the jet and also perpendicular relative thereto. All of the other nozzles are also adjustable in a similar manner. The adjustment of the liquid jet recorder thus is carried out, on the one hand, through adjustment of the base plates supporting the jet nozzles (stub shaft 17, bearing 18) and, on the other hand, through the individual adjustment of each single nozzle until the desired acute angle is obtained between the jets of the jet nozzles of a recorder unit. The base plate 16 forms a support for the jet nozzles 4 through 6, which is rotatable about an axis extending in perpendicular to the central jet located in the plane of the jet, and displaceable along the direction of this axis.

While there has been shown what is considered to be the preferred embodiment of the invention, it will be obvious that modifications may be made which come within the scope of the disclosure of the specification.

What is claimed is:

1. In a liquid jet recorder having a jet ejecting arrangement; a pressure means conduit connected to said jet ejecting arrangement for causing the latter to propel an electrically-conductive recording liquid against a spot on a recording carrier; a control electrode located intermediate said jet ejecting arrangement and said recording carrier; a signal source for electrically charging the drops of said recording liquid between the latter and said control electrode so as to cause said drops to mutually repel each other and to disintegrate into a vapor cloud which is precipitated on the control electrode; and means for producing relative movement between said jet ejecting arrangement and said recording carrier so as to form an image constituted of image lines, the improvement comprising: said jet ejecting arrangement including a plurality of jet nozzles, a supply pump commonly supplying said jet nozzles with recording liquid through said pressure means conduit, said jet nozzles being oriented so that their ejected liquid jets impinge on said recording carrier directly adjacent to each other, said liquid jets of said jet nozzles penetrating said single control electrode and being commonly controlled thereby.

2. A recorder as claimed in claim 1, said jet nozzles being oriented so that their jets form an acute angle relative to each other in the plane of a jet.

3. A recorder as claimed in claim 2, comprising support means, each said jet nozzle including a bendable tube fastened to said support means, each said tube being adjustable in the plane of said jet and perpendicular relative thereto.

4. A recorder as claimed in claim 3, comprising a bushing for receiving said tube, said bushing being located intermediate said support means and an end of said jet nozzle, said support means being rotatable in the plane of the jet, said tube being supported in said bushing so as to be adjustable perpendicular to the plane of the jet.

5. A recorder as claimed in claim 2, comprising a single support means for the jet nozzles associated with said common control electrode, said support means being rotatable about an axis located in the plane of the jet and extending in perpendicular to a central jet, and being displaceable along said axis.

6. A recorder as claimed in claim 1, comprising a plurality of such jet ejecting arrangements corresponding to the number of colors for recording a color image from said colors, each arrangement including a plurality of jet nozzles supplied by a common pump with an image color and associated with a common control electrode.

* * * * *